E. M. APPLEBAUGH.
BRAKE HEAD.
APPLICATION FILED JULY 11, 1911.
1,013,103.
Patented Jan. 2, 1912.
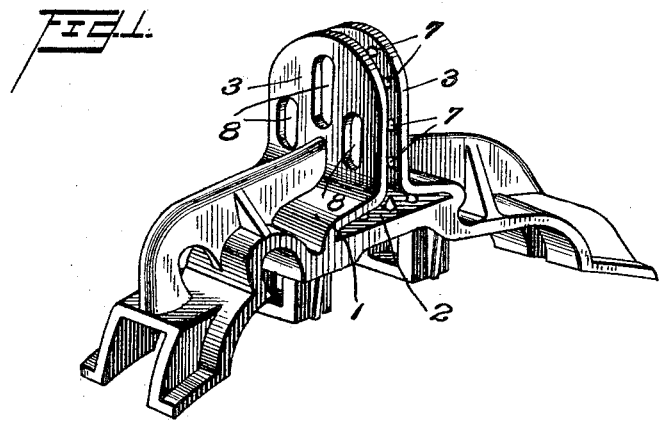
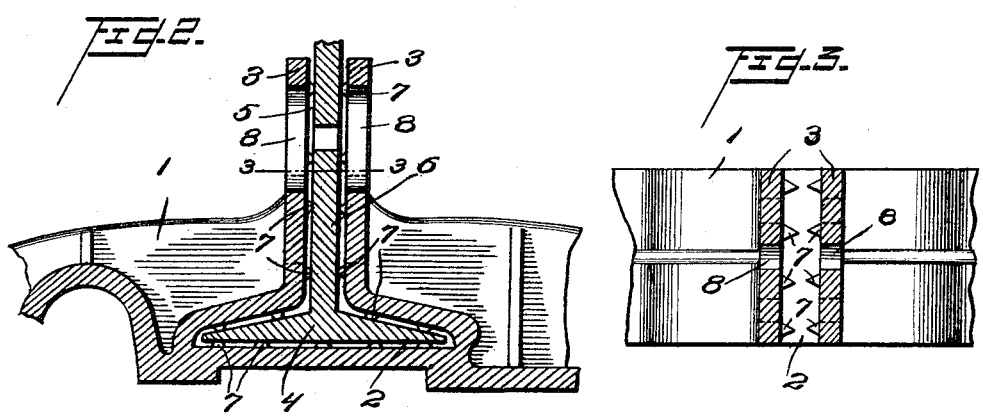
Witnesses
N. Strauss
E. N. Foster
Inventor
Eugene M. Applebaugh,
By Samuel W. Foster
Attorney
COLUMBIA PLANOGRAPH CO., WASHINGTON, D. C.

UNITED STATES PATENT OFFICE.

EUGENE M. APPLEBAUGH, OF DANVILLE, PENNSYLVANIA.

BRAKE-HEAD.

1,013,103. Specification of Letters Patent. Patented Jan. 2, 1912.

Application filed July 11, 1911. Serial No. 637,867.

*To all whom it may concern:*

Be it known that I, EUGENE M. APPLE-BAUGH, a citizen of the United States, residing at Danville, in the county of Montour and State of Pennsylvania, have invented certain new and useful Improvements in Brake-Heads, of which the following is a specification.

My invention relates to improvements in brake heads, the object of the invention being to provide a brake head which is adapted for use in connection with various makes of beams in use.

Cars at the present day are equipped with brake beams of various manufactures, differing in size, weight and arrangement of rivet receiving opening, and to provide a brake head which may be used in connection with any ordinary beam, is the primary object of my invention, and it consists in certain novel features of construction and combinations and arrangements of parts, as will be more fully hereinafter described and pointed out in the claims.

In the accompanying drawings: Figure 1, is a perspective view illustrating my improved brake head. Fig. 2, is an enlarged fragmentary longitudinal section through the central portion of the head, and Fig. 3, is a view in transverse section on the line 3—3 of Fig. 2, but showing the lugs before being sheared by the beam.

1, represents my improved brake head which is recessed as shown at 2, and made with parallel integral ears 3 communicating with the recess, and as the recess receives the base flanges 4 of a brake beam 5, the ears 3 are positioned at opposite sides of the web 6 of the beam.

Beams are made of various sizes and weights, and to enable the use of the head on variously made beams, the wall of recess 2 and the inner faces of ears 3 are made with integral inwardly projecting lugs 7. When the head is driven onto the end of a beam by means of a sledge, as is customary, the beam will shear the lugs so that a snug fit is had. The greater length of lug will be sheared according to the size of the beam. To enable the head to be secured on beams having variously arranged rivet openings, the ears 3 are made with three slots 8, varying in position and length so that one of them will register with the rivet opening in the beam. It will therefore be seen that my brake head is practically a universal head, as it is designed to be used with many makes and sizes of beams which results in a great saving and is a source of great convenience to railroads.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A brake head having a brake beam receiving recess, and lugs on the inner face of said recess adapted to be sheared by the beam when the head is forced thereon, substantially as described.

2. A brake head having a brake beam receiving recess, and integral parallel ears on said head having a plurality of rivet receiving elongated slots therein, and lugs on the inner faces of said ears and in said recess adapted to be sheared by the brake beam when forced thereon, substantially as described.

In testimony whereof I have signed my name to this specification in the presence of two subscribing witnesses.

EUGENE M. APPLEBAUGH.

Witnesses:
K. E. MARKS,
P. F. FARNSWORTH.

Copies of this patent may be obtained for five cents each, by addressing the "Commissioner of Patents, Washington, D. C."